(12) United States Patent
Baimetov et al.

(10) Patent No.: US 12,456,180 B2
(45) Date of Patent: Oct. 28, 2025

(54) SYSTEM AND METHOD FOR AN AUDIO-VISUAL AVATAR EVALUATION

(71) Applicants: Constructor Technology AG, Schaffhausen (CH); Constructor Education and Research Genossenschaft, Schaffhausen (CH)

(72) Inventors: Ilya Baimetov, Redmond, WA (US); Denis Parkhomenko, Moscow (RU); Marcel de Korte, Stockholm (SE); Ivan Kirillov, Moscow (RU); Dmitriy Obukhov, Istanbul (TR); Alexey Rybak, Istanbul (TR); Laurent Dedenis, Singapore (SG); Serg Bell, Singapore (SG); Stanislav Protasov, Singapore (SG)

(73) Assignee: Constructor Technology AG, Schaffhausen (CH)

( * ) Notice: Subject to any disclaimer, the term of this patent is extended or adjusted under 35 U.S.C. 154(b) by 253 days.

(21) Appl. No.: 18/059,395

(22) Filed: Nov. 28, 2022

(65) Prior Publication Data

US 2024/0177283 A1    May 30, 2024

(51) Int. Cl.
*G10L 15/22* (2006.01)
*G06T 7/00* (2017.01)
(Continued)

(52) U.S. Cl.
CPC ............ *G06T 7/0002* (2013.01); *G10L 15/02* (2013.01); *G10L 15/22* (2013.01); *G10L 25/57* (2013.01);
(Continued)

(58) Field of Classification Search
None
See application file for complete search history.

(56) References Cited

U.S. PATENT DOCUMENTS

| 8,937,620 B1 * | 1/2015 | Teller ................... G11B 27/031 345/473 |
| 10,592,733 B1 | 3/2020 | Ramanarayanan et al. |

(Continued)

FOREIGN PATENT DOCUMENTS

| CN | 112116589 A | 12/2020 |
| CN | 106250400 B | 3/2021 |

(Continued)

OTHER PUBLICATIONS

Minna Pakanen, Paula Alavesa, Niels Van Berkel, Timo Koskela, and Timo Ojala: "nice to see you virtually": Thoughtful design and evaluation of virtual avatar of the other user in ar and vr based telexistence systems. Entertainment Computing, 40:100457, 2022. 1.1, 5.1, 6 https://www.sciencedirect.com/science/article/pii/S1875952121000549.

(Continued)

*Primary Examiner* — Seong-Ah A Shin
(74) *Attorney, Agent, or Firm* — ESPE Legal Consultancy FZ-LLC

(57) ABSTRACT

The present disclosure relates to a system to evaluate an avatar generated by an avatar generator. The system comprises an evaluation module including an audio evaluation module for evaluating audio features and a video evaluation module for evaluating video features. Evaluation of the avatar includes extracting audio and video features from the avatar and applying a set of evaluation metrics for generating audio and video evaluation scores. The scores are combined to generate a final score. For avatar generator evaluation, audio clip and video clip are provided to the audio evaluation module and video evaluation module, respectively. A set of evaluation metrics is applied for evaluation. Each metric can generate a score. All scores are combined to generate a final evaluation score.

16 Claims, 6 Drawing Sheets

(51) Int. Cl.
*G10L 15/02* (2006.01)
*G10L 25/57* (2013.01)
*G10L 25/60* (2013.01)
*G10L 25/84* (2013.01)
*G10L 25/90* (2013.01)

(52) U.S. Cl.
CPC .............. *G10L 25/60* (2013.01); *G10L 25/84* (2013.01); *G10L 25/90* (2013.01); *G06T 2207/10016* (2013.01); *G06T 2207/20081* (2013.01); *G06T 2207/30196* (2013.01)

(56) References Cited

U.S. PATENT DOCUMENTS

| | | | | |
|---|---|---|---|---|
| 12,167,169 | B1* | 12/2024 | Ganju | H04N 7/157 |
| 2003/0028378 | A1* | 2/2003 | August | G10L 13/00 |
| | | | | 704/260 |
| 2006/0247046 | A1* | 11/2006 | Choi | A63F 13/44 |
| | | | | 463/36 |
| 2014/0358541 | A1* | 12/2014 | Colibro | G10L 15/063 |
| | | | | 704/245 |
| 2015/0036883 | A1* | 2/2015 | Deri | G06V 20/52 |
| | | | | 382/103 |
| 2018/0350144 | A1* | 12/2018 | Rathod | G06Q 20/3224 |
| 2022/0036617 | A1* | 2/2022 | Biswas | G06T 13/40 |
| 2023/0071994 | A1* | 3/2023 | Day | G16H 50/20 |
| 2023/0237722 | A1* | 7/2023 | Stewart | G06V 10/764 |
| | | | | 345/473 |
| 2023/0260183 | A1* | 8/2023 | Anderson | G06T 13/40 |
| | | | | 345/473 |
| 2023/0334904 | A1* | 10/2023 | Monti | G06V 40/172 |
| 2024/0104816 | A1* | 3/2024 | Shaw | A63F 13/58 |
| 2024/0202245 | A1* | 6/2024 | Mahadevan | G06T 19/20 |
| 2024/0233229 | A1* | 7/2024 | Tumanov | G06N 3/0455 |
| 2024/0303947 | A1* | 9/2024 | Domae | A63F 13/573 |
| 2024/0420225 | A1* | 12/2024 | Johri | G06T 17/20 |

FOREIGN PATENT DOCUMENTS

| | | |
|---|---|---|
| WO | WO2021257868 A1 | 12/2021 |
| WO | WO2022087147 A1 | 4/2022 |

OTHER PUBLICATIONS

Wu, Y., Wang, Y., Jung, S., Hoermann, S., and Lindeman, R. W. (2021): Using a Fully Expressive Avatar to Collaborate in Virtual Reality: Evaluation of Task Performance, Presence, and Attraction. Front. Virtual Real. 2, 641296. doi:10.3389/frvir.2021.641296 https://www.frontiersin.org/articles/10.3389/frvir.2021.641296/full.

Prajwal, K. R., et al.:"A lip sync expert is all you need for speech to lip generation in the wild." Proceedings of the 28th ACM International Conference on Multimedia. 2020.

Video Multi-Method Assessment Fusion https://github.com/Netflix/vmaf.

Heusel, Martin, et al.:"Gans trained by a two time-scale update rule converge to a local nash equilibrium." Advances in neural information processing systems 30, 2017.

Salimans, Tim, et al.:"Improved techniques for training gans." Advances in neural information processing systems 29, 2016.

Zhang, Richard, et al.:"The unreasonable effectiveness of deep features as a perceptual metric." Proceedings of the IEEE conference on computer vision and pattern recognition. 2018.

IEEE Trans: "IEEE Recommended Practice for Speech Quality Measurements,". Audio Electroacoust., vol. 17, No. 3, pp. 225-246, 1969, doi: 10.1109/TAU.1969.1162058.

M. Viswanathan and M. Viswanathan: "Measuring speech quality for text-to-speech systems: development and assessment of a modified mean opinion score (MOS) scale," Comput. Speech Lang., vol. 19, No. 1, pp. 55-83, Jan. 2005, doi: 10.1016/J.CSL.2003.12.001.

A. W. Rix, J. G. Beerends, M. P. Hollier, and A. P. Hekstra: "Perceptual evaluation of speech quality (PESQ)—a new method for speech quality assessment of telephone networks and codecs," in 2001 IEEE International Conference on Acoustics, Speech, and Signal Processing. Proceedings (Cat. No. 01CH37221), 2001, vol. 2, pp. 749-752 vol.2, doi: 10.1109/ICASSP.2001.941023.

C.-C. Lo et al.: "MOSNet: Deep Learning-based Objective Assessment for Voice Conversion.".

Adrian Łancucki. Fastpitch: Parallel text-to-speech with pitch prediction. ' arXiv preprint arXiv:2006.06873, 2020.

J. Kim, J. Kong, and J. Son: "Conditional variational autoencoder with adversarial learning for end-to-end text-to-speech," arXiv preprint arXiv:2106.06103, 2021.

* cited by examiner

SYSTEM AND METHOD FOR AN AUDIO-VISUAL AVATAR EVALUATION

FIELD OF THE INVENTION

The present disclosure generally relates to an automated evaluation system. In particular, the present disclosure relates to a system and method for automatically evaluating an audio-visual avatar and an avatar generator.

BACKGROUND OF THE INVENTION

Virtual Reality (VR) or Augmented Reality (AR) environments are playing a crucial role in various applications. For example, some applications will allow users to play games in a VR environment offering a virtual reality experience to the users. Some applications allow users to interact with impersonated virtual objects designed in three-dimensional graphical environments for offering the user an interactive experience. There are numerous software applications that are available currently, which can create such virtual objects in an interactive environment. The conventional software applications implement different methods and interfaces to create virtual objects in an avatar format, i.e., a virtual personality in an interactive environment, for example, a tutor delivering a lecture in a virtual classroom.

With increasing applicability of virtual avatars in a human-driven environment, such as classroom sets up, VR games, and the like, it is of paramount importance to ensure the quality and naturalness of the virtual avatar. The naturalness may be indicative of striking similarities, in terms of facial gestures, body language, hand gestures, pitch, voice, expressions, voice modulations and the like, between the target person, such as a teacher in a classroom setup, and the virtual avatar. Higher degree of similarities results in higher degree of naturalness, thereby rendering natural experience to the user. Therefore, the virtual avatar must be generated with maximum possible similarities with the target person.

Furthermore, in addition to the physical attributes, it is also crucial to ensure the quality of the virtual avatar. The virtual avatar is usually created based upon a text input. The text, which a user wishes to convert into dialogues to be spoken by the avatar, is provided to the avatar generator. The avatar generator converts the text into speech. This conversion must be accurate with no or minimal time lag exhibited during the conversion. As soon as the text file or document is provided, it should be converted into the speech without a time lag to render a better interactive experience. For example, if a student asks a question, the virtual avatar of the teacher should be able to answer it. A text file, document, cited text from a book or any such input that may satisfy the student's query, is downloaded, and is converted into a speech by the avatar generator. The converted speech is spoken by the virtual avatar of the teacher in response to the question of the student. In this way, the interactive environment of the classroom can be set up. For effective functioning of the interactive environment, the quality and time required for the speech conversion must be ensured.

Currently, there exist systems and methods to evaluate the virtual avatar. However, these systems rely on extensive human intervention and manual evaluation. Manual evaluation includes determining the similarities between the virtual avatar and the target person by manual testing. Manual evaluation systems are prone to human error, are time-extensive, and are not cost-effective due to the required skilled labor.

There is a need for an improved system and method for automatically evaluating a generated avatar and an avatar generator to ensure high levels of natural appearance and overall quality of a virtual avatar video and the avatar generator, without human intervention.

SUMMARY OF THE INVENTION

A method of automated evaluation of an avatar is described in accordance with some embodiments. The method comprises the steps of evaluating a generated avatar generated by an avatar generator and generating an evaluation score based on the naturalness of the avatar.

According to some embodiments, the method comprises evaluating an avatar generator.

The generator works by obtaining a speech generated by a text-to-speech (TTS) module using an audio evaluator, obtaining a video clip generated by a video generator using a video evaluator, and obtaining the audio features of the target person by the audio evaluator. The generator also obtains video features of the target person using the video evaluator, evaluates the speech generated the TTS by comparing with the audio features of the target person using a set of audio metrics, and generates an audio evaluation score. The video clip is evaluated by comparing the speech with the video features of the target person using a set of video metrics and generating a video evaluation score. The audio evaluation score and the video evaluation score are combined, generating a combined naturalness score for the avatar generator based on the combination.

A system of automated evaluation of an avatar comprises an evaluation module. The evaluation module is configured to obtain a generated avatar from an avatar generator, extract audio features and visual features of the generated avatar, obtain audio features and video features of a target person, compare the audio features and the visual features of the generated avatar with the audio features and the visual features of the target person, and generate a naturalness score for the generated avatar based on the comparison.

According to some embodiments, the system further includes the evaluation module for evaluating an avatar generator. The evaluation module comprises an audio evaluator, a video evaluator, and a score combination module.

According to one embodiment, the Audio evaluator is configured to obtain speech generated by a TTS module of the avatar generator, obtain the audio features of the target person, compare the speech and the audio features using a set of audio metrics, and generate an audio evaluation score based on the comparison.

According to some embodiment, the video evaluator is configured to obtain a video clip generated by a video generator of the avatar generator, obtain the video features of the target person, compare the video clip with the video features using a set of video metrics, and generate a video evaluation score based on the comparison.

According to some embodiments, the score combination module is configured to combine the audio evaluation score and the video evaluation score, generate a combined naturalness score for the avatar generator based on the combination, and generate an overall naturalness score based on the naturalness score and the combined naturalness score.

DETAILED DESCRIPTION

A target person is engaged in a specific activity or role. The target person can be a particular person of interest to be virtually cloned to create an avatar, or audio-visual digital representation resembling the targeted person or a figure or a character.

Figure 1:
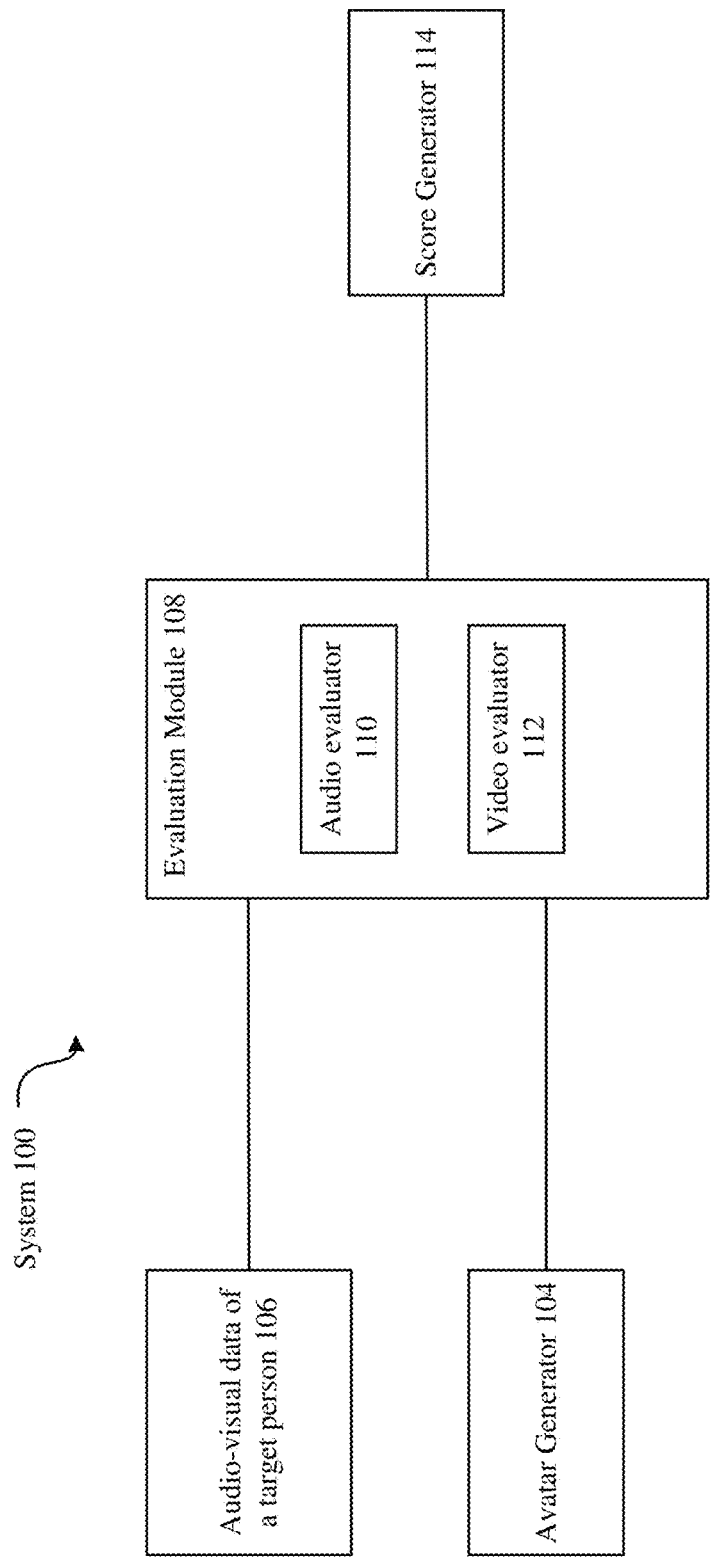
FIG. 1 is a block diagram of an avatar generator, in accordance with one implementation of the present embodiment.

FIG. 1 is a block diagram of a system 100 to evaluate an avatar and an avatar generator 104, in accordance with one implementation of the present embodiment. In one implementation, the avatar generator 104 is configured to create the avatar. The system 100 is capable of automatically evaluating the avatar generator 104 and the avatar generated by the avatar generator 104. In one embodiment, the system 100 is configured to evaluate the avatar. In another embodiment, the system 100 is configured to evaluate the avatar generator 104. In another embodiment, the system 100 is configured to evaluate the avatar generator 104 and the avatar generated by the avatar generator 104.

The avatar generator 104, in accordance with one implementation of the present embodiment, is implemented to create a controlled avatar. The avatar generator 104 is configured to receive a training dataset relating to a target person, a figure, or a character, and based on the training dataset, synthesizes an audio clip and a video clip corresponding to the target person. The avatar generator 104 further receives a text input to convert the text into a speech. The speech is a set of dialogues to be spoken by the avatar. The avatar generator 104 creates a video of the avatar based on the synthesized video clip. The video is combined with the converted speech and is applied with a gesture script that ensures the naturalness of the avatar. Based on the gesture script, the physical attributes of the target person are implemented, and the avatar is produced with a body language and facial expressions resembling the target person. The output of the avatar generator 104, a virtual avatar, is obtained by an evaluation module 108 for evaluating the degree of similarities between the avatar and the target person.

In accordance with the embodiment, the evaluation module 108 is configured to evaluate the virtual avatar based on a set of evaluation metrics. In one implementation, the set of evaluation module 108 may include a set of audio evaluation metrics and a set of video evaluation metrics. The set of the audio metrics can evaluate the audio features, whereas the set of the video evaluation metrics can evaluate the video features. Combinedly, the audio-visual evaluation is carried out on the avatar and a final evaluation score is generated by a score generator 114.

In accordance with the embodiment, the evaluation module 108 is configured to evaluate the avatar generator 104. The avatar generator 104 mainly comprises a text-to-speech (TTS) module and a video generator. The TTS module 105 is implemented to convert the text input into the speech. The speech is then processed by the evaluation module 108 for extracting audio features and applying the set of audio evaluation metrics to perform evaluation. The video generator 107 is implemented to create a video, which is then processed by the evaluation module 108 for extracting video features and applying the set of video evaluation metrics to perform the evaluation. By combining the evaluation score of the audio features and the video features, the final evaluation score of the avatar generator 104 is estimated.

In one implementation, the audio data of the target person 106 is collected by the system 100. The audio data 106 may be utilized to extract the audio characteristics and features of the target person and his sound profile, such as a traditional male voice, a traditional female voice, language accent, voice modulation, average pitch, voice expressions like sadness, excitement, or happiness, or voice variations. The speech markup data, which may be a part of the audio features, includes certain phenomena, such as phonic symbols, expressions, specific phrases, or time codes. These extracted audio characteristics and features are used as reference data to compare with the audio features of the avatar.

In one implementation, the video data of the target person 106 is collected by the system 100. The video data 106 may be the reference line, based on which, a visual representation of three-dimensional graphical content indicating a realistic image of the target person can be generated. The graphical content may contain features selected based on an appearance of the target person. In one example, the video features may represent the physical appearance of the target person including his facial features, skin tone, eye color, hairstyle, and such. In one example, the video features may include body posture and body embodiments such as shoulders, neck, arms, fingers, torso, waist, hips, legs, or feet. In one embodiment, the video features include only head and neck movements. In another embodiment, the video features are a full-body representation of the target person including head and body. In one example, the head movements include lip synchronization, facial gestures, or facial expressions. In another example, body movements include the hands gestures, different embodiment movements, or body postures.

Figure 2:
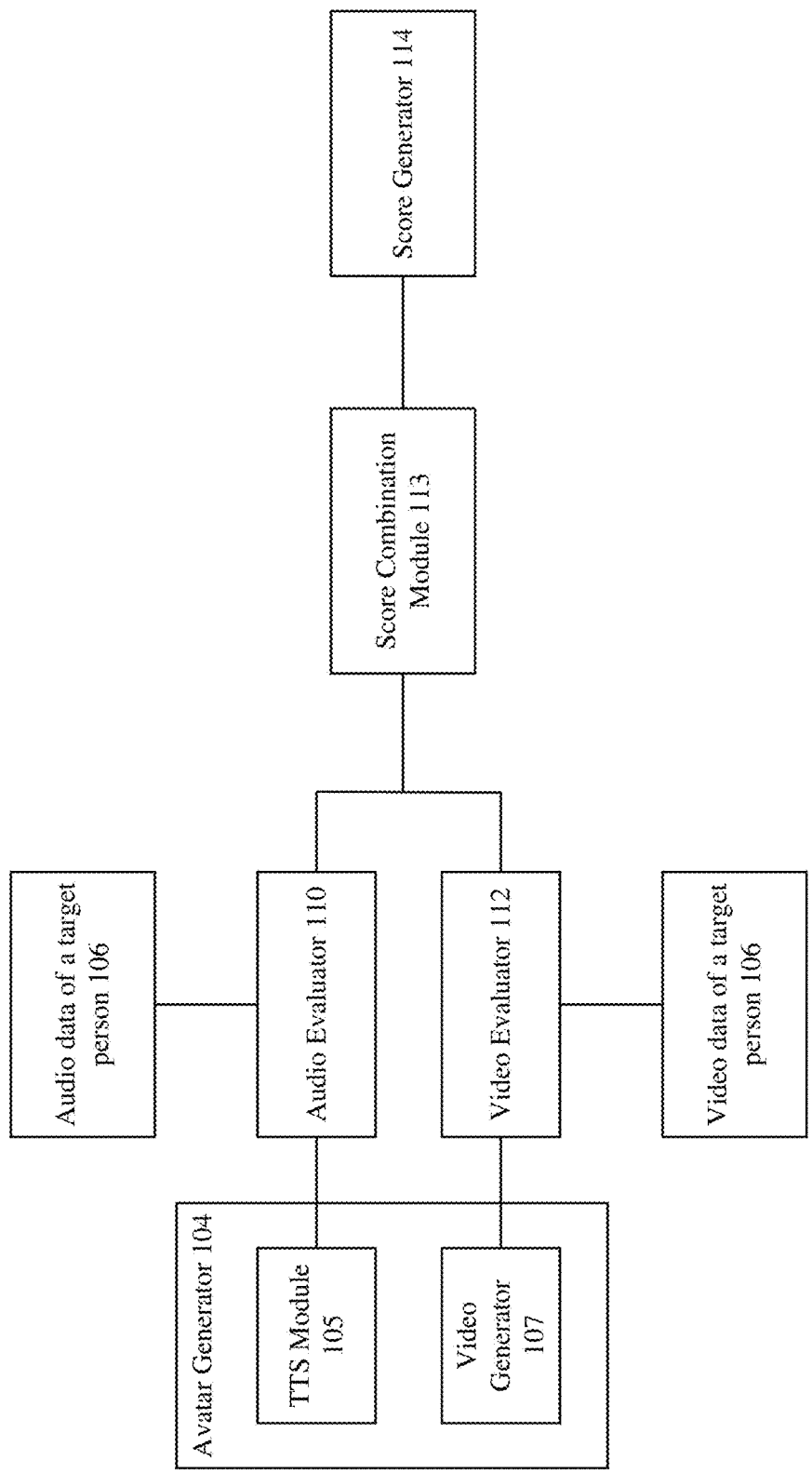
FIG. 2 is a schematic of the evaluation module implemented to evaluate the avatar generator, in accordance with one implementation of the present embodiment.

FIG. 2 is a schematic of the evaluation module 108 implemented to evaluate a generated avatar 102, in accordance with one implementation of the present embodiment. The evaluation module 108 is configured to obtain a naturalness score for the avatar generated by the avatar generator 104. The avatar is an audio-video clip generated by the generated avatar 102 which is an input to the evaluation module 108.

FIG. 2 is a schematic of the evaluation module 108 implemented to evaluate the avatar generator 104, in accordance with one implementation of the present embodiment. The evaluation module 108 receives audio and video inputs from the avatar generator 104, and mainly includes the audio evaluator 110 and the video evaluator 112.

The avatar generator 104 comprises a text-to-speech (TTS) module 105 and a video generator. The TTS module 105, in one implementation, is configured to receive the formatted text as an input and convert the text input into a speech output. The TTS module 105 transforms the input text into normalized speech as if a target person is talking. In an example, the TTS module 105 provides lifelike voices of arbitrary persons in various languages. In another example, the TTS module 105 can select the desired sound profile, i.e., a traditional male voice, a traditional female voice, high pitched voice, low pitched voice, and so on, in a variety of accents. In one example, the input text includes words, a group of words in format of the sentence, phrases, and word clusters with applied grammatical expressions that must be spoken by the audio-visual avatar.

In one implementation, the features of the speech generated by the TTS module 105 are evaluated by the audio evaluator 110. The audio evaluator 110 is configured to receive the speech from the TTS module 105, extract the audio features, and apply the set of audio evaluation metrics to the audio features in order to evaluate the audio features and generate a naturalness score for the audio features. The set of audio evaluation metrics comprises; ASR-based evaluation metrics (Word Error rate (WER), Character Error Rate (CER), log-probabilities), Voice-Activity Detection (VAD)-based evaluation metrics (Voice Data Enhancement (VDE), silence accuracy): F0-contour-based evaluation metrics (F0 mean, F0 std, log F0 log F0 root-mean-square error (RMSE), Gross Pitch Error (GPE), F0 Frame Error (FFE)); Speaker-similarity metrics: Equal Error Rate (EERU), Cosine (COS); and Speech pronunciation statistics. Each metric can generate a score. All scores are combined to generate an audio evaluation score.

In accordance with one implementation of the embodiment, the video generator 107 is configured to generate the video clip and combine the video clip with the audio clip generated by the TTS module 105 to create an audio-visual avatar. The video clip may be a visual representation of three-dimensional graphical content indicating a realistic image of the target person. The graphical content may contain features selected based on an appearance of the target person. In one example, the video clip may represent the physical appearance of the target person including his facial features, skin tone, eye color, or hairstyle. In one example, the video clone may include body posture and body embodiments such as shoulders, neck, arms, fingers, torso, waist, hips, legs, or feet. In one embodiment, the video clip may include only head and neck movements. In one example, the head movements may include lip synchronization, facial gestures, facial expressions, and any combination thereof. In another example, the body movements may include the hands gestures, different embodiment movements, body postures and any combination thereof. These video features are extracted from the video clip for evaluation.

In one implementation, the video evaluator 112 is configured to receive the video features from the video generator 107 for evaluation. The video features are applied to the set of video metrics to generate a naturalness score of the video features. The set of video metrics comprises fully referenced image and video quality assessment metrics, in case of reenactment of a reference video: Peak signal-to-noise ratio (PSNR), Multi-scale Structured Similarity Indexing Method (MS-SSIM), Feature Similarity Indexing Method (FSIM), Learned Perceptual Image Patch Similarity (LPIPS), Video Multimethod Assessment Fusion (VMAF), Visual Information Fidelity (VIF), Natural Language Processing (NLP); no reference image and video quality metrics; Deep neural network-based IQA model (WaDIQaM), Deep Bilinear Convolutional Neural Network (DBCNN), Transformers, Relative ranking, and Self consistency (TReS), Chip Quality Assurance (ChipQA); distribution-based metrics: Frechet Inception Distance (FID), Frechet Video Distance (FVD); lip synchronization metrics (SyncNet); and identity metrics (ArcFace). Each metric can generate a score. All such scores are combined to determine a video evaluation score.

In one embodiment, the audio-visual data of the target person 106 is provided to the audio evaluator 110 and the video evaluator 112. The audio features are provided to the audio evaluator 110 as a reference audio data. Audio features extracted from the audio clip are compared with the audio features of the target person, and based on the comparison, the naturalness score is generated. In one implementation, the video features are provided to the video evaluator 112 as a reference video data. Video features extracted from the video clip are compared with the video features of the target person, and based on the comparison, the naturalness score is generated.

In accordance with an embodiment, the naturalness scores generated by the audio evaluator 110 and the video evaluator 112 are provided to the score combination module 113. The score combination module 113, in one implementation, is configured to combine the both naturalness scores to produce one or more human-interpretable scores of the avatar. The score can be combined using one or more methods by the score generator 114.

In one implementation, a weighted average with fixed weight method is applied to combine the scores. In this method, each metric score is assigned with a weight scaled to a predetermined range, for example, a range of 0-100. An average of all the weights is calculated to determine the final score.

In another implementation, a trainable combination method is applied to combine the score. This method utilizes a dataset containing pairs of videos and mean opinion scores (MOS) corresponding to the videos are collected. The dataset is then utilized to train a regression method, such as Support Vector Regression (SVR) or Multilayer Perceptron (MLP), to predict the final score.

Figure 3:
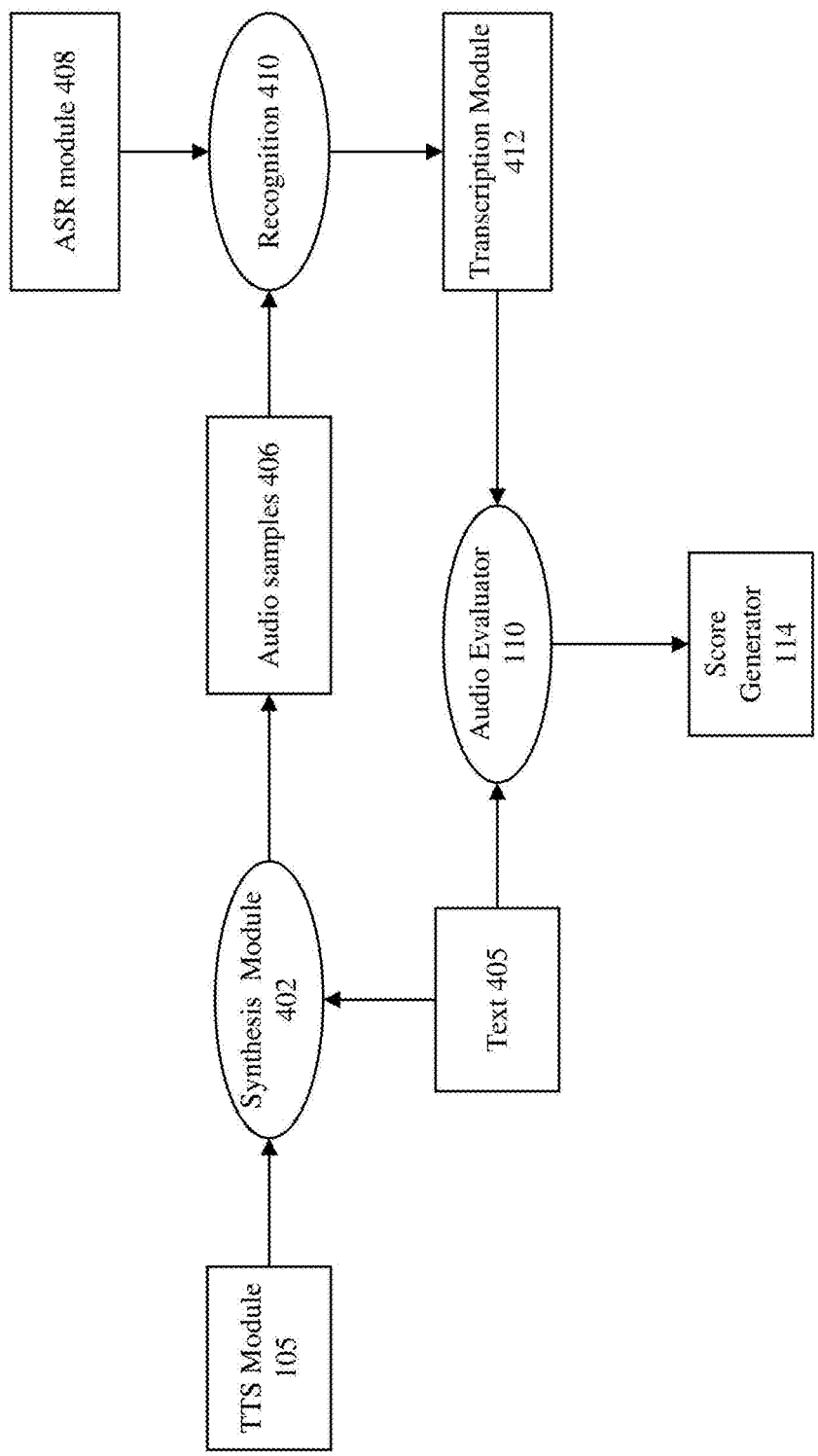
FIG. 3 is a schematic of the audio evaluator module based on an automatic speech recognition (ASR) metric, in accordance with one implementation of the present embodiment.

FIG. 3 is a schematic of the audio evaluator 110 module based on ASR metric, in accordance with one implementation of the present embodiment. As shown in the Figure, TTS module 105 is applied to a synthesis module 402, in one implementation. The synthesis module 402 is configured to receive a text input, and based on the TTS module 105, synthesize an audio clip. The audio clip may include the text input converted into speech. One or more audio samples 406 are collected from the audio clip for evaluation. A recognition module 410 is configured to perform decoding of audio samples 406. In one implementation, the recognition module 410 is coupled to an ASR module 408, where decoding of the audio samples 406 is performed using ASR module 408. The ASR module 408 is a set of ASR metrics and includes but may not be limited to open-released ESPnet ASR models and open-released NVidia ASR models. A transcription module 412, in one implementation, is configured to generate transcripts. The transcripts are provided to the audio evaluator 110. The audio evaluator 110 receives the text input and the transcripts, and based on comparison, the score generator 114 generates the final score.

Figure 4:
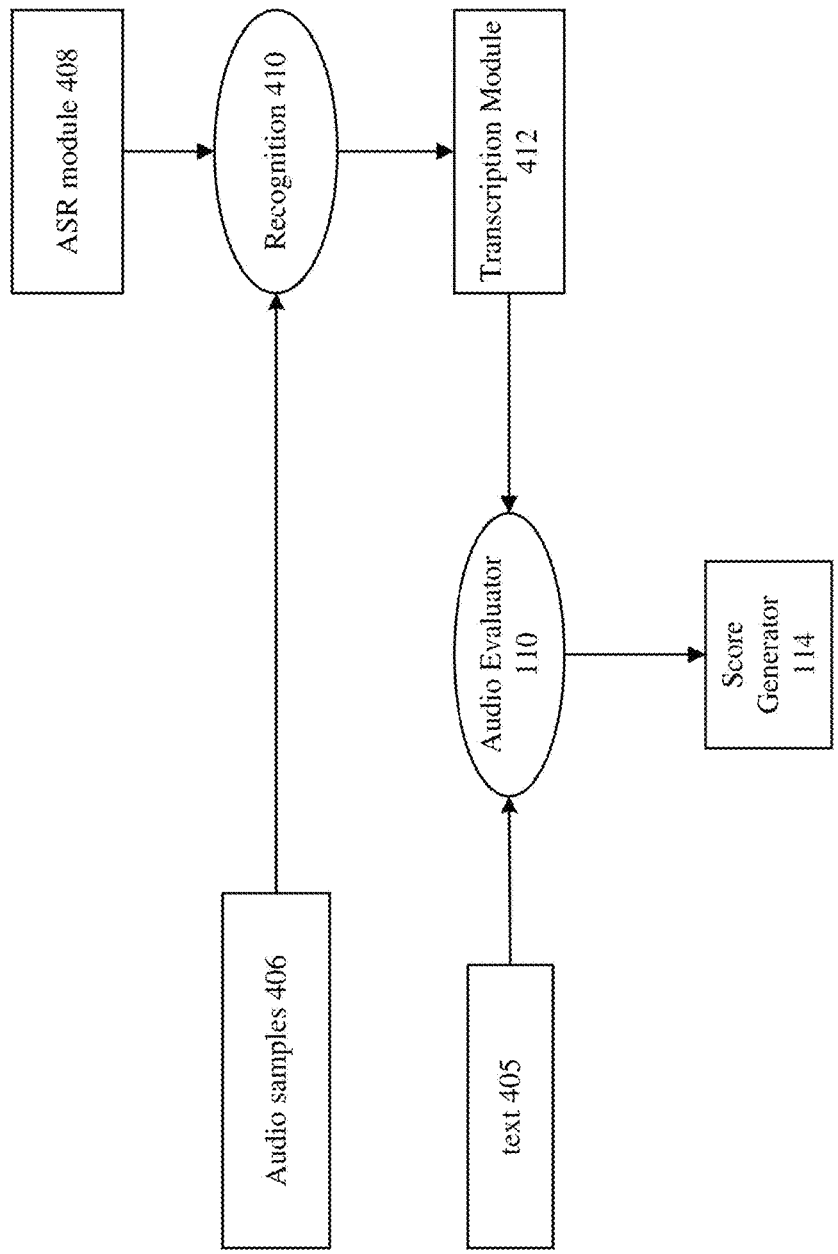
FIG. 4 is a schematic of an audio sample record evaluation based on ASR metric, in accordance with one implementation of the present embodiment.

FIG. 4 is a schematic of an audio sample record evaluation based on ASR metric, in accordance with one implementation of the present embodiment. As shown in the figure, the audio samples 406, collected from the converted speech, are provided to the recognition module 410. The ASR module 408 is configured to apply the ASR metrics to the recognition module 410. The transcription module 412 is configured to generate transcripts. The transcripts are provided to the audio evaluator 110. The Audio evaluator 110 receives a reference text 405 and the transcripts as an input, and based on the input, a score is generated.

Figure 5:
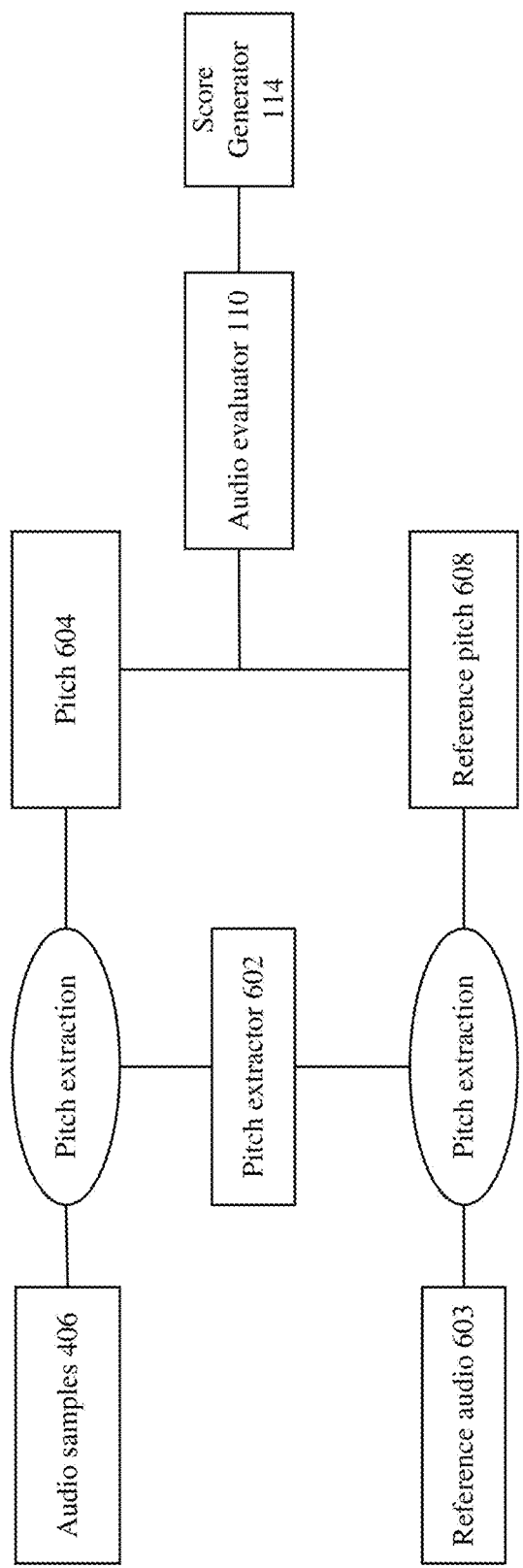
FIG. 5 is a schematic of pitch-based audio evaluation, in accordance with one implementation of the present embodiment.

FIG. 5 is a schematic of pitch-based audio evaluation, in accordance with one implementation of the present embodiment. As shown in the figure, pitch 604 is extracted from the audio samples 406 and reference audio records 603 by a pitch extractor 602. Pitch 604 from the audio samples 406 and a reference pitch 608 from the reference records 603 are provided to the audio evaluator 110. At the audio evaluator 110, the set of audio evaluation metrics is applied, and the score is generated from each metric at the score generator 114. The set of audio evaluation metrics includes but may not be limited to Voicing Decision Error (VDE), Gross Pitch Error (GPE), F0 Frame Error (FFE), log F0 root-mean-square error (log F0 RMSE), F0 mean, and F0 standard deviation. Pitch extractor 602 may be, for example, pyworld, praat, and parselmouth.

Figure 6:
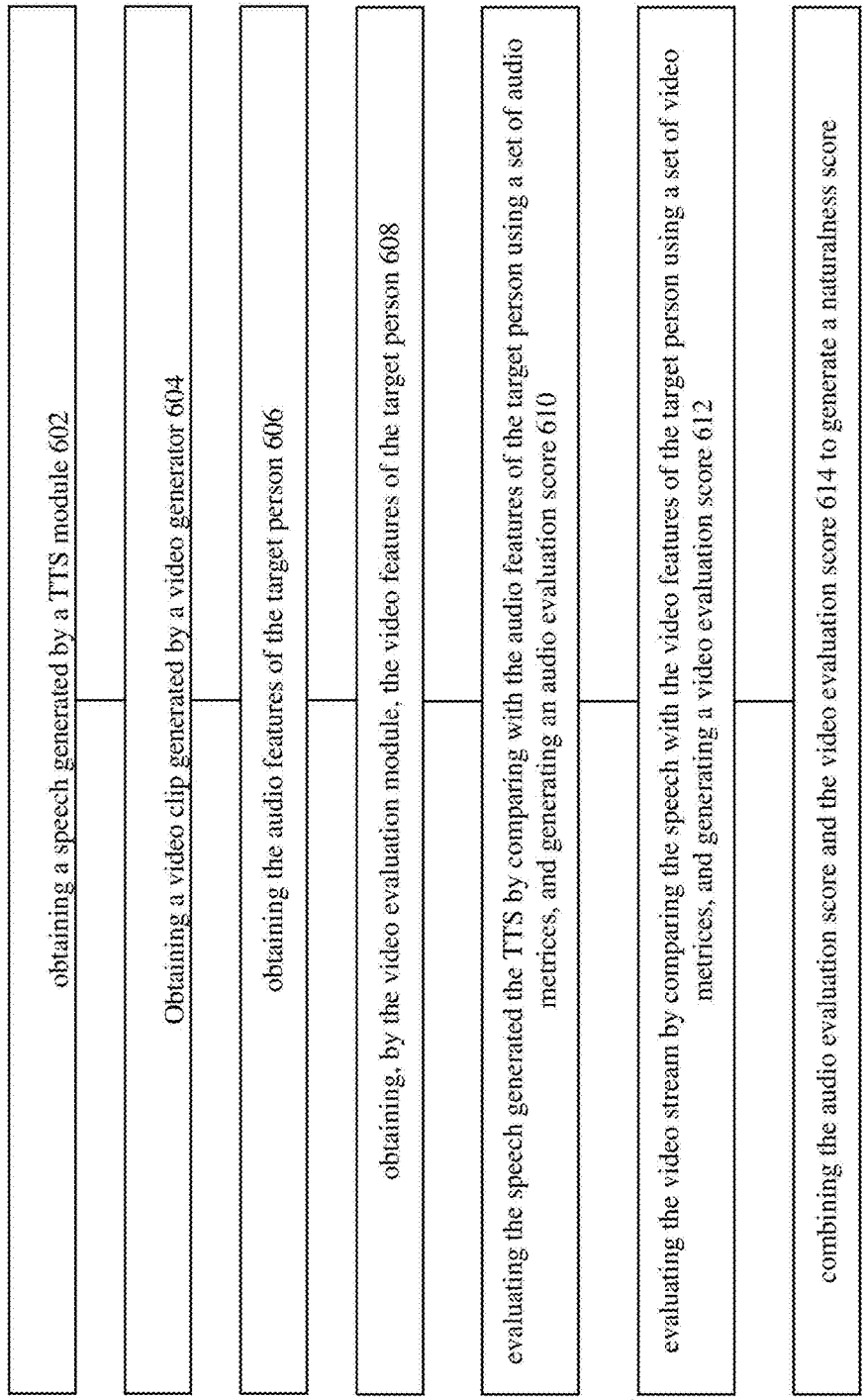
FIG. 6 depicts a flow diagram of a method for automated evaluation of an avatar, in accordance with one implementation of the present embodiment.

FIG. 6 depicts a flow diagram of a method for automated evaluation of an avatar generated by the avatar generator 102.

Method step 602 includes obtaining, by an audio evaluator 110, a speech generated by a TTS module 105.

Method step 604 includes obtaining, by a video evaluator 112, a video clip generated by a video generator.

Method step 606 includes obtaining, by the audio evaluator 110, the audio features of the target person.

Method step 608 includes obtaining, by the video evaluator 112, the video features of the target person.

Method step 610 includes evaluating the speech generated by the TTS module 105 by comparing with the audio features of the target person using a set of audio metrics, and generating an audio evaluation score.

Method step 612 includes evaluating the video clip by comparing the speech with the video features of the target person using a set of video metrics, and generating a video evaluation score.

Method step 614 includes combining the audio evaluation score and the video evaluation score for generating a combined naturalness score for the avatar generator 104 based on the combination.

The method 600 further comprises, evaluating speech intelligibility using ASR based evaluation metrics, evaluating audio-noise level using VAD based evaluation metrics, evaluating naturalness of speech intonation using pitch-based metrics, evaluating voice similarities using EER and COS metrics, and evaluating naturalness of speech pronunciation using pronunciation statistics.

The method 600 further comprises, generating the audio evaluation score by combining the score of each of the set of audio metrics.

The method 600 further comprises evaluating the video clip including evaluating a video quality with a reference image using PSNR, MS-SSIM, FSIM, LPIPS, VMAF, VIF, NLP metrics, evaluating a video quality with no reference images using WaDIQaM, DUBCNN, TRES, ChipQA, evaluating distribution using distribution-based metrics, evaluating lip synchronization using lip synchronization metrics, and evaluating identity of target using identity metrics.

The method 600 further comprises generating the video evaluation score by combining scores generated by each of the set of video metrics.

The method 600 further comprises the step of generating combined naturalness score includes generating one or more human-interpretable scores of an avatar.

The method 600 further comprises the step of combining the audio evaluation score and the video evaluation score comprises combining using at least one of a weighted average with fixed weights method and a trainable combination method.

The method 600 further comprises using the weighted average with fixed weights method that includes scaling all evaluation scores to a predefined range of weights and determining an average of the weights.

The method 600 further comprises using the trainable combination method that includes usage of a dataset containing pairs of a video of the target person and corresponding mean opinion scores to train a regression module to predict the final score.

The invention claimed is:

1. A method for automated evaluation of an avatar generated by an avatar generator comprising the steps of:
    obtaining, by an audio evaluator, a speech generated by a text-to-speech module;
    obtaining, by a video evaluator, a video clip generated by a video generator;
    obtaining, by the audio evaluator, the audio features of the target person;
    obtaining, by the video evaluator, the video features of the target person;
    comparing the speech with the audio features of the target person using a set of audio metrics, and generating an audio evaluation score for the speech;
    wherein generating the audio evaluation score comprises evaluating speech intelligibility using automatic-speech-recognition (ASR) based evaluation metrics, evaluating audio noise level using voice-activity-detection (VAD) based evaluation metrics, evaluating naturalness of speech intonation using pitch-based metrics, evaluating voice similarities using equal-error-rate (EER) and cosine (COS) metrics, and evaluating speech pronunciation statistics;
    comparing the video clip with the video features of the target person using a set of video metrics, and generating a video evaluation score for the video clip;
    combining the audio evaluation score and the video evaluation score; and
    generating a combined naturalness score for the avatar generator based on the combined score of the audio evaluation score and the video evaluation score.

2. The method of claim 1, wherein evaluation scores generated by each of the set of audio metrics are combined to generate the audio evaluation score.

3. The method of claim 1, wherein the step of evaluating the video clip further comprises:
    evaluating a video quality with a reference image using a peak signal-to-noise ratio (PSNR), a multi-scale structured similarity indexing method (MS-SSIM), a feature similarity indexing method (FSIM), a learned perceptual image patch similarity (LPIPS), a video multimethod assessment fusion (VMAF), visual information fidelity, (VIF), or natural language processing (NLP) metrics;
    evaluating a video quality with no reference images using a deep neural network-based IQA model (WaDIQaM), a deep bilinear convolutional neural network (DUBCNN), a transformer, relative ranking, and self consistency (TReS) model, or a chip quality assurance (ChipQA) model;
    evaluating distribution using distribution-based metrics;
    evaluating lip synchronization using lip synchronization metrics; and
    evaluating an identity of the target using identity metrics.

4. The method of claim 3, wherein the evaluation scores generated by each of the set of video metrics are combined to generate a video evaluation score.

5. The method of claim 1, wherein the step of generating a combined naturalness score includes generating one or more human-interpretable scores of an avatar.

6. The method of claim 1, wherein the step of combining the audio evaluation score and the video evaluation score comprises combining using at least one of a weighted average with fixed weights method and a trainable combination method.

7. The method of claim 6, wherein the weighted average with fixed weights method comprises scaling all evaluation scores to a predefined range of weights and determining an average of the weights.

8. The method of claim 6, wherein the trainable combination method comprises: using a dataset containing pairs of a video of the target person and corresponding mean opinion scores to train a regression module to predict the final score.

9. An evaluation system for automated evaluation of an avatar generated by an avatar generator comprising:
a processor configured to:
obtain a speech generated by a text-to-speech module of the avatar generator;
obtain the audio features of the target person;
compare the speech and the audio features using a set of audio metrics; wherein the audio metrics comprise automatic-speech-recognition (ASR) based evaluation metrics voice-activity-detection (VAD) based evaluation metrics, gross-pitch-error (GPE), or F0-frame-error (FFE) metrics, and equal-error-rate (EER) and cosine (COS) metrics, and generate an audio evaluation score based on the comparison;
the processor further configured to:
obtain a video clip generated by a video generator of the avatar generator;
obtain the video features of the target person;
compare the video clip with the video features using a set of video metrics; and
generate a video evaluation score based on the comparison; and
a score combination module configured to:
combine the audio evaluation score and the video evaluation score;
generate a combined naturalness score for the avatar generator based on the combination; and
generate an overall naturalness score based on the naturalness score and the combined naturalness score.

10. The system of claim 9, wherein evaluation scores generated by each of the set of audio metrics are combined to generate the audio evaluation score.

11. The system of claim 9, wherein the set of video metric includes:
a peak signal-to-noise ratio PSNR, a multi-scale structured similarity indexing method MS-SSIM, a feature similarity indexing method FSIM, a learned perceptual image patch similarity LPIPS, a video multimethod assessment fusion VMAF, visual information fidelity VIF, or natural language processing NLP metrics;
a deep neural network-based IQA model (WaDIQaM), a deep bilinear convolutional neural network (DUB-CNN), a transformer, relative ranking, and self consistency (TReS), or chip quality assurance (ChipQA) model;
distribution-based metrics;
lip synchronization metrics; or
identity metrics.

12. The system of claim 9, wherein the evaluation scores generated by each of the set of video metrics are combined to generate a video evaluation score.

13. The system of claim 9, wherein the score combination module generates one or more human-interpretable scores of an avatar.

14. The system of claim 9, wherein the score combination module is configured to combine the audio evaluation score and the video evaluation score using at least one of a weighted average with fixed weights method and a trainable combination method.

15. The system of claim 14, wherein the score combination module using the weighted average with fixed weights method is configured to scale all evaluation scores to a predefined range of weights and determine an average of the weights.

16. The system of claim 14, wherein the score combination module using the trainable combination method is configured to use a dataset containing pairs of a video of the target person and corresponding mean opinion scores to train a regression module to predict the final score.

* * * * *